United States Patent [19]
Freeman

[11] Patent Number: 4,957,229
[45] Date of Patent: Sep. 18, 1990

[54] VEHICLE MOUNTED ARCHERY BOW HOLDER

[76] Inventor: Lowell J. D. Freeman, 26255 Highpass Rd., Junction City, Oreg. 97448

[21] Appl. No.: 459,977

[22] Filed: Jan. 2, 1990

[51] Int. Cl.$^5$ ............... B60R 9/00; B60R 11/00
[52] U.S. Cl. ................ 224/42.45 R; 224/916; 224/42.43; 124/23.1
[58] Field of Search ............ 224/42.45 R, 42.43, 224/916, 42.03 B, 913, 914; 248/214, 309.1, 122; 124/23 R; 211/88, 13

[56] References Cited

U.S. PATENT DOCUMENTS

| | | | |
|---|---|---|---|
| 2,593,789 | 4/1952 | Pearson | 211/13 |
| 3,295,732 | 1/1967 | Haven | 224/916 |
| 3,441,241 | 4/1969 | Brooks | 248/122 |
| 4,282,849 | 8/1981 | Russ | 124/23 R |
| 4,474,296 | 10/1984 | Hartman | 248/122 |
| 4,542,873 | 9/1985 | Matherly et al. | 248/309.1 |
| 4,754,904 | 7/1988 | Fischer et al. | 224/916 |
| 4,915,273 | 4/1990 | Allen | 224/30 A |

Primary Examiner—Henry J. Recla
Assistant Examiner—Keith Kupferschmid
Attorney, Agent, or Firm—James D. Givnan, Jr.

[57] ABSTRACT

A holder for a bow permitting bow storage in the cargo box or cab of a pickup truck. An upright main member has upper and lower arm members shaped for bow and bowstring retention with the latter exerting a downward force on the bow to hold the bow in place. A support extends outwardly toward truck structure for attachment to same. A modified holder includes a support for attachment to the wall of the truck cab.

9 Claims, 1 Drawing Sheet

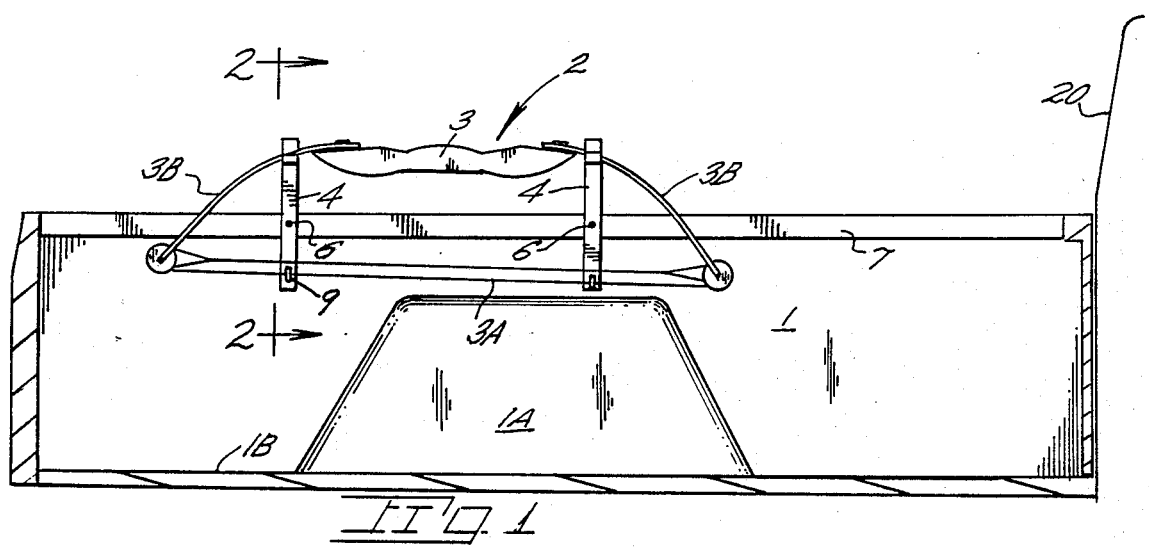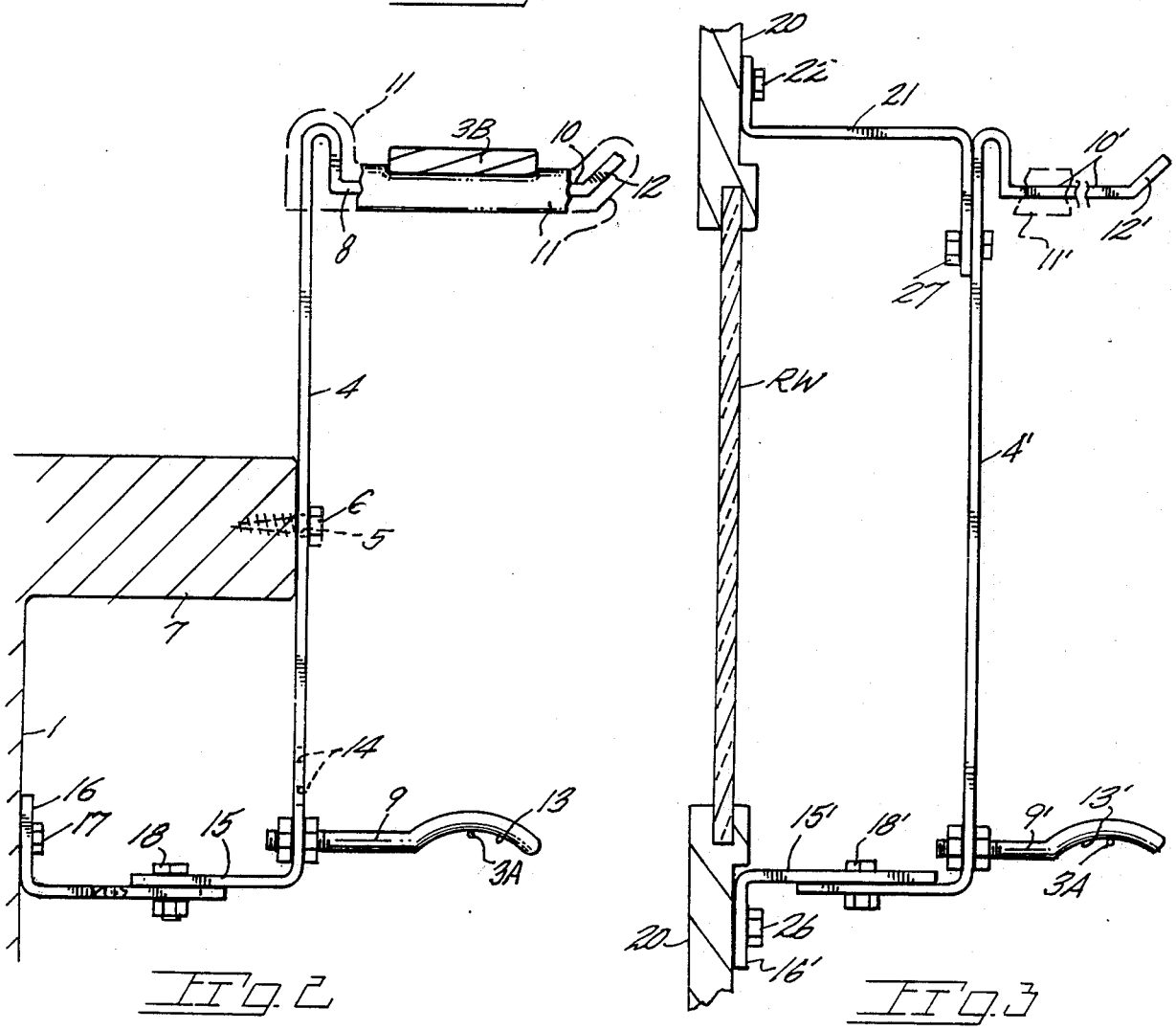

VEHICLE MOUNTED ARCHERY BOW HOLDER

BACKGROUND OF THE INVENTION

The present invention pertains generally to holders or racks on vehicles for the transport of small articles such as recreational equipment.

Pickup trucks are widely used by bow hunters and present the problem of bow stowage. As currently used bows are of complex construction, it is highly inconvenient to transport same in the cab of the truck particularly if there are two or more hunters. The use of gun racks of the type mounted in pickup truck cabs are not feasible in view of the fact that a compound type bow does not fit the supports intended to receive a rifle or shotgun. Transport of a bow in the truck box is likely to result in damage to the bow.

SUMMARY OF THE PRESENT INVENTION

The present invention is embodied in a holder for installation on or in a vehicle which permits the transport of a hunting bow in a secure manner.

Arm members on the present holder serve to receive the bow and position same in a highly accessible manner. The holder permits bow attachment to the holder using a tensioned bowstring to urge the bow proper into seated engagement with an arm of the holder. An upright main member of the holder is also adapted to engage truck box or cab structure and to retain same in place against forces resulting from travel over rough roads or terrain. An arm member is shaped to retain the bow in place thereon while a remaining arm component constitutes a hook on which the bowstring may be engaged in a tensioned manner to hold the bow in place. Accordingly, the present holder utilizes a bowstring in a secondary manner as a means for snugly attaching an archery bow to a vehicle mounted holder.

Important objectives of the present invention include the provision of a bow holder suited for installation either in a pickup truck box or cab which provides secure attachment of an archery bow in a highly accessible manner; the provision of a bow holder which utilizes the bowstring to accomplish biased engagement of the bow with the holder yet enabling rapid detachment of the bow when desired; the provision of a bow holder suitable for installation in a wide range of pickup truck makes and models.

BRIEF DESCRIPTION OF THE DRAWINGS

In the accompanying drawings:

FIG. 1 is a fragmentary sectional view of the interior of a pickup truck box with the present bow holder attached thereto;

FIG. 2 is an elevational view of the present bow holder taken along line 2—2 of FIG. 1; and FIG. 3 is a view similar to FIG. 2 but showing a modified form of the holder.

DETAILED DESCRIPTION OF THE PREFERRED EMBODIMENTS

With continuing attention to the drawings wherein applied reference numerals indicate parts similarly hereinafter identified, the reference numeral 1 indicates a side wall structure of a pickup truck box or cargo area. A wheel well housing is at 1A with a cargo bed indicated at 1B.

Indicated generally at 2 is an archery bow which is shown as being of the compound type with a bow riser 3 and a bowstring at 3A with limbs at 3B.

The present bow holder includes an upright main member 4 adapted at 5 to receive a fastener 6 for engagement with the inwardly extending rail or rim 7 of truck box structure. An upper arm member at 8 extends laterally of main member 4 as does a lower arm member at 9. The upper arm member has a recessed surface area 10 which serves to support the archery bow proper in a confined manner. Preferably the recessed surface 10 and adjacent arm structure is provided with a resilient coating 11. An upturned end segment 12 of the upper arm member assures bow retention.

Lower arm member 9 includes a bowstring retainer portion 13 with which the bowstring 3A is engaged prior to lifting of the bow for downwardly biased engagement with the upper arm member. In one form of the invention, the arm members are spaced approximately nine inches apart to assure biased engagement both of the bowstring and bow proper with the arm members. To accommodate different bow configurations, main member 4 has a series of vertically spaced apertures 14 to permit selective installation of lower arm 9 to effect the desired bow and bowstring biased engagement with the holder.

A support 15 integral with the lower end of main member 4 extends laterally toward the wall structure 1 of the truck box and terminates in a foot 16 which abuts the box structure. If desired, the foot may be secured by a sheet metal screw 17 which extends through the inner wall of a double walled pickup truck box. To accommodate a wide range of box profiles, it is desirable that the support 15 be segmented with communicating slots receiving a fastener assembly 18 to lock the segments to one another.

With attention to FIG. 3, an interior wall surface 20 of a truck cab serves to receive a modified holder adapted for attachment above and below a rear window RW of the truck cab. Parts of the modified holder corresponding to those parts earlier described are indicated with prime reference numerals. In the modified form, an auxiliary support 21 is added to the holder of FIG. 2 which is suitably secured to main member 4 as by a fastener assembly 27. A sheet metal screw 22 extends through the inner wall of the double wall truck cab. A support 15' integral with the lower end of main member 4' is equipped with a foot 16' for attachment to the interior wall of the cab by a fastener 26.

In use the archery bowstring 3A is initially engaged with the underside 13 of the lower arm members of a pair of holders with subsequent upward displacement of the bow proper resulting in a slight flexing of the bow required to accomplish biased engagement of same on surface 10 of the upper arm. Accordingly, the bow is attached in a positive manner to prevent any chance of displacement during the travel of rough roads or terrain. Bow removal entails simply lifting of the bow followed by subsequent lateral displacement of the bow to disengage the bowstring from lower arm surface 13. In some instances the bow limb or limbs may engage the holder or holders.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. Bracket means for attachment to a truck for transporting an archery bow, said bracket means comprising, a main member adapted at spaced apart points for upright engagement with the truck, a support on said main member for abutment with the truck, and arm members on said main member and extending outwardly therefrom, one of said arm members including bow retention means, the other of said arm members including a retainer for engagement with the bowstring of the bow.

2. The bracket means claimed in claim 1 wherein said retention means is a recessed surface.

3. The bracket means claimed in claim 1 additionally including a secondary support projecting laterally from said main member for contact with the truck.

4. The bracket means claimed in claim 1 wherein said support includes adjustable members and fastener means locking said adjustable members to one another.

5. In combination, a truck wall structure, and an archery bow holder including an upright main member, support means mounting the main member in an offset manner from said wall structure, arm members on said upright member, said arm members having oppositely facing surfaces to support a bow and to confine a bowstring of said bow.

6. The combination claimed in claim 5 wherein said support means includes multiple supports projecting laterally from the upright main member and terminating in contact with the truck wall structure.

7. The combination claimed in claim 6 wherein at least one of said supports includes adjustable members and fastener means locking said adjustable members to one another.

8. The combination claimed in claim 5 wherein said oppositely facing surfaces are inclined in diverging directions for purposes of bow and bowstring retention.

9. The combination claimed in claim 5 wherein said upright main member defines an aperture, fastener means extending through said aperture and into said truck wall structure.

* * * * *